United States Patent
Johnson

(10) Patent No.: US 7,394,375 B2
(45) Date of Patent: Jul. 1, 2008

(54) COUPLER WITH RADIO FREQUENCY IDENTIFICATION TAG

(75) Inventor: Robert K. Johnson, Blaine, MN (US)

(73) Assignee: Colder Products Company, St. Paul, MN (US)

( * ) Notice: Subject to any disclaimer, the term of this patent is extended or adjusted under 35 U.S.C. 154(b) by 67 days.

(21) Appl. No.: 11/233,939

(22) Filed: Sep. 22, 2005

(65) Prior Publication Data

US 2006/0076419 A1    Apr. 13, 2006

Related U.S. Application Data

(60) Provisional application No. 60/612,711, filed on Sep. 24, 2004.

(51) Int. Cl.
  *G08B 13/14*    (2006.01)
  *B29C 30/06*    (2006.01)
  *B29D 30/58*    (2006.01)
(52) U.S. Cl. .................. 340/572.1; 340/572.8; 156/125
(58) Field of Classification Search ... 340/568.1–572.9, 340/592, 603–626, 853.1–856.4; 174/47; 137/1–802; 156/25
  See application file for complete search history.

(56) References Cited

U.S. PATENT DOCUMENTS

| | | | |
|---|---|---|---|
| 4,698,631 A * | 10/1987 | Kelly et al. .............. 340/853.1 |
| 5,604,681 A | 2/1997 | Koeninger .................. 364/509 |
| 6,649,829 B2 | 11/2003 | Garber et al. ................. 174/47 |
| 6,879,876 B2 * | 4/2005 | O'Dougherty et al. ...... 700/231 |
| 6,880,992 B2 * | 4/2005 | Odamura et al. ............ 400/208 |
| 7,019,711 B2 * | 3/2006 | Johnson et al. ............. 343/872 |
| 7,201,185 B2 * | 4/2007 | Poppe et al. ................ 137/554 |
| 2002/0133942 A1 * | 9/2002 | Kenison et al. ............... 29/841 |
| 2002/0170731 A1 | 11/2002 | Garber et al. ................. 174/47 |
| 2005/0068182 A1 * | 3/2005 | Dunlap et al. ............ 340/572.8 |
| 2005/0087235 A1 * | 4/2005 | Skorpik et al. .............. 137/554 |
| 2005/0174241 A1 * | 8/2005 | Olsen ...................... 340/572.8 |
| 2005/0230109 A1 * | 10/2005 | Kammann et al. ........ 166/255.1 |

FOREIGN PATENT DOCUMENTS

DE    101 10 194 A1    3/2002

OTHER PUBLICATIONS

Wikipedia, Free Encyclopedia- Injection Molding.*

* cited by examiner

*Primary Examiner*—George A Bugg
*Assistant Examiner*—Jennifer Mehmood
(74) *Attorney, Agent, or Firm*—Merchant & Gould P.C.

(57) ABSTRACT

A coupler can include a main body including a first end and a second end, and a flow passage between the first and second ends to allow fluid flow therethrough. The coupler can also include a frame member, and a radio frequency identification tag coupled to the frame member. The frame member is configured to be molded into the main body so that the radio frequency identification tag is incorporated into the main body.

16 Claims, 13 Drawing Sheets

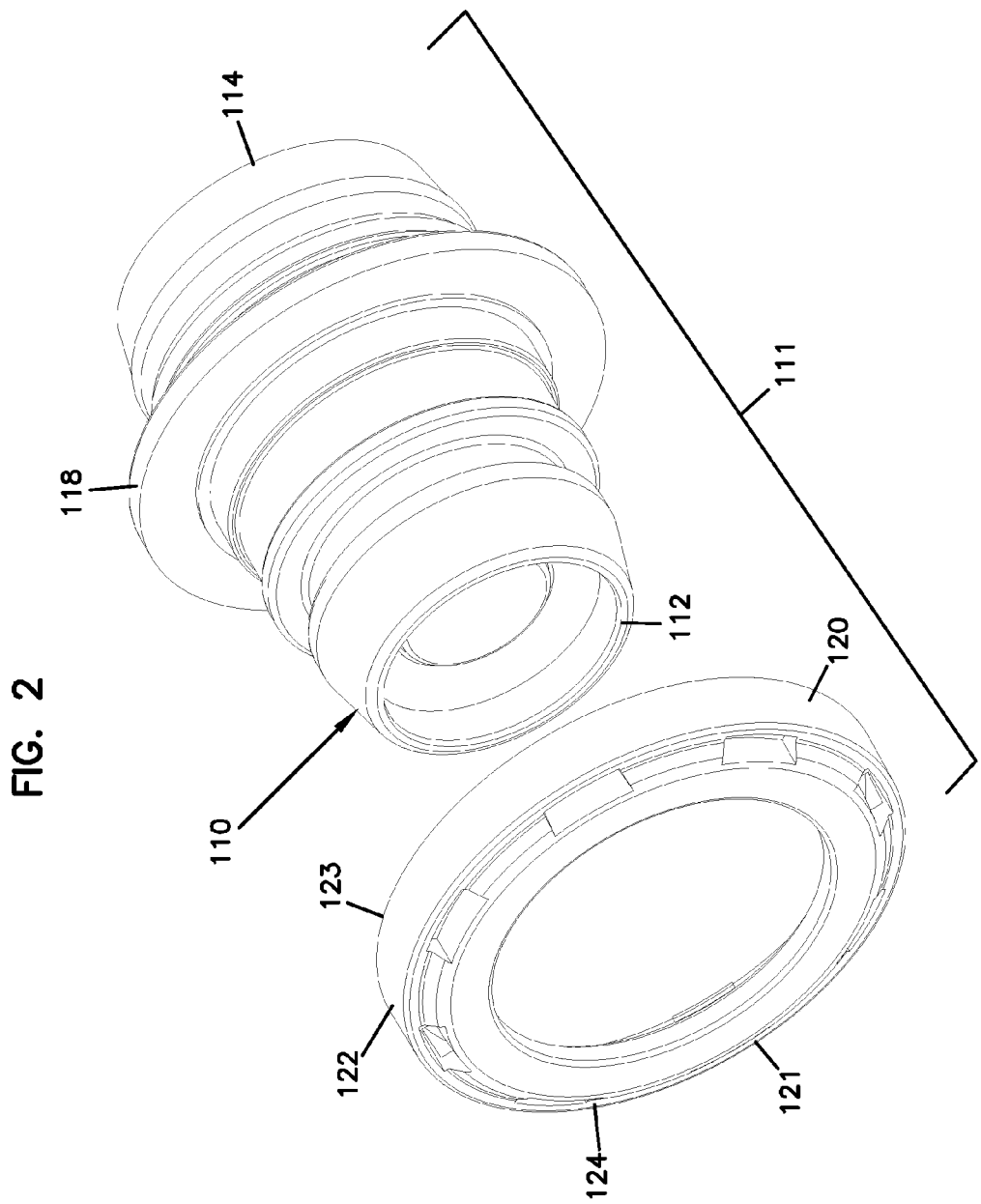

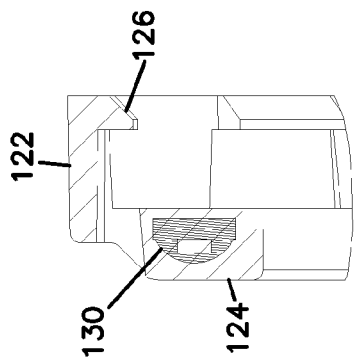
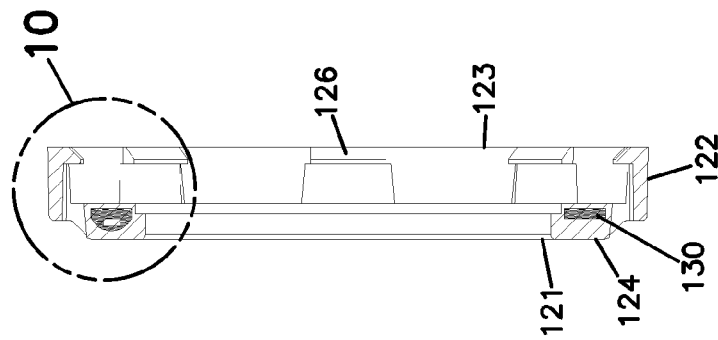
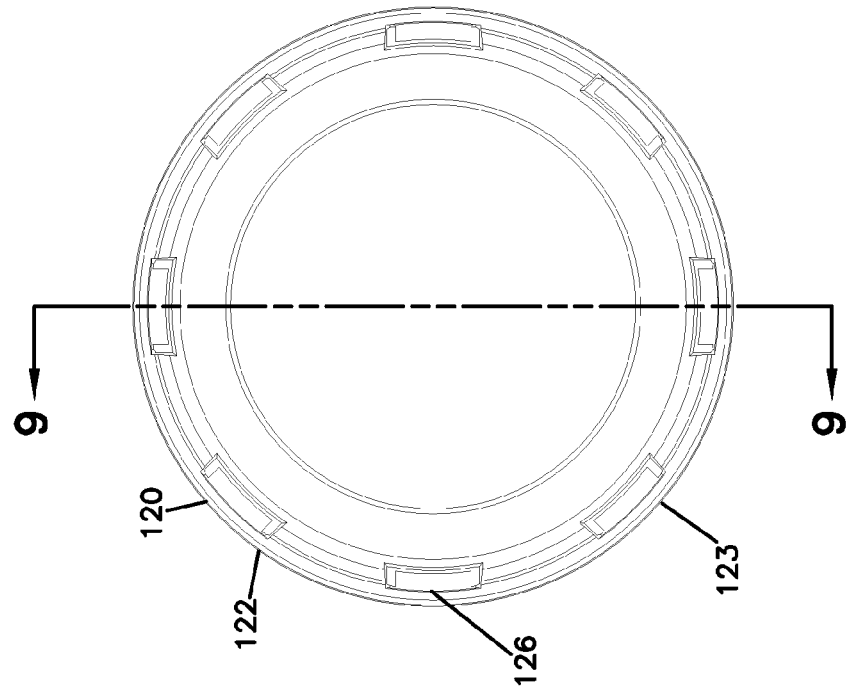

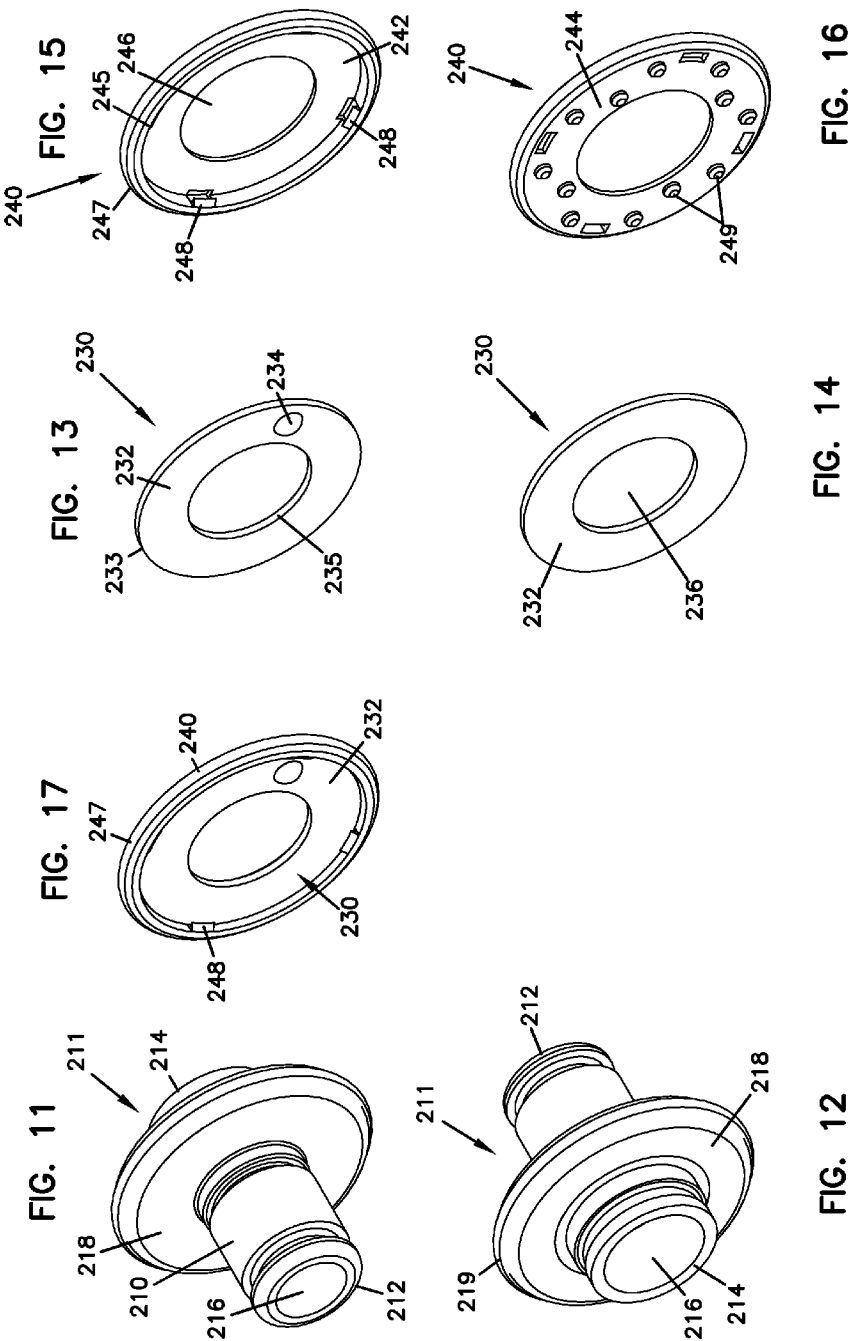

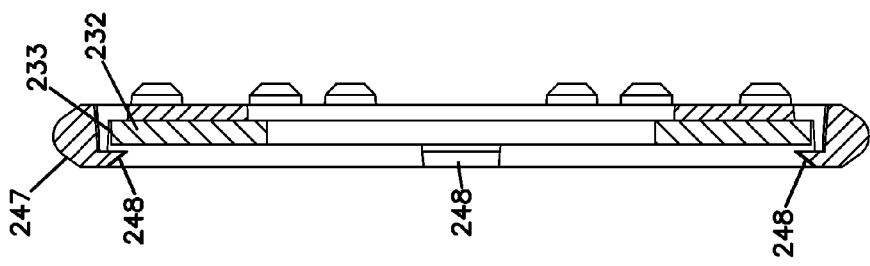
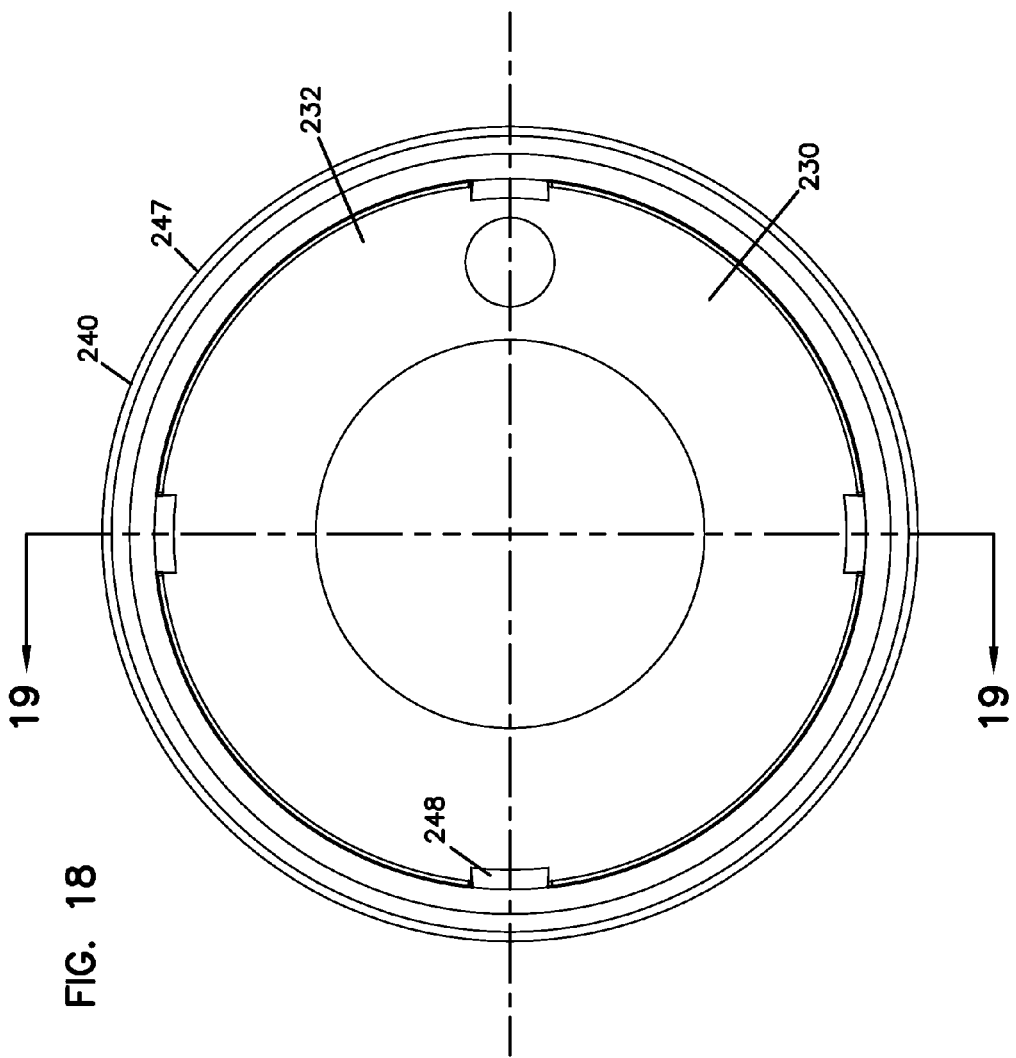

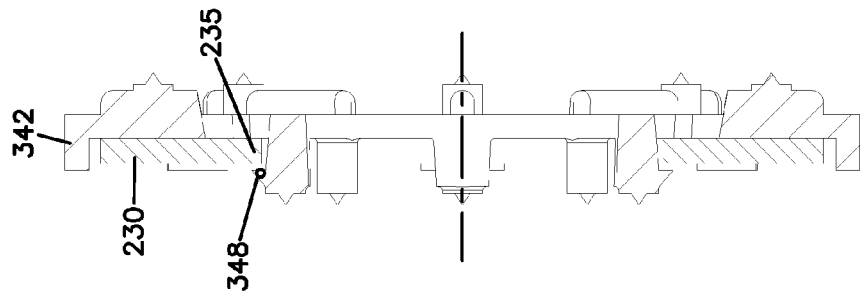
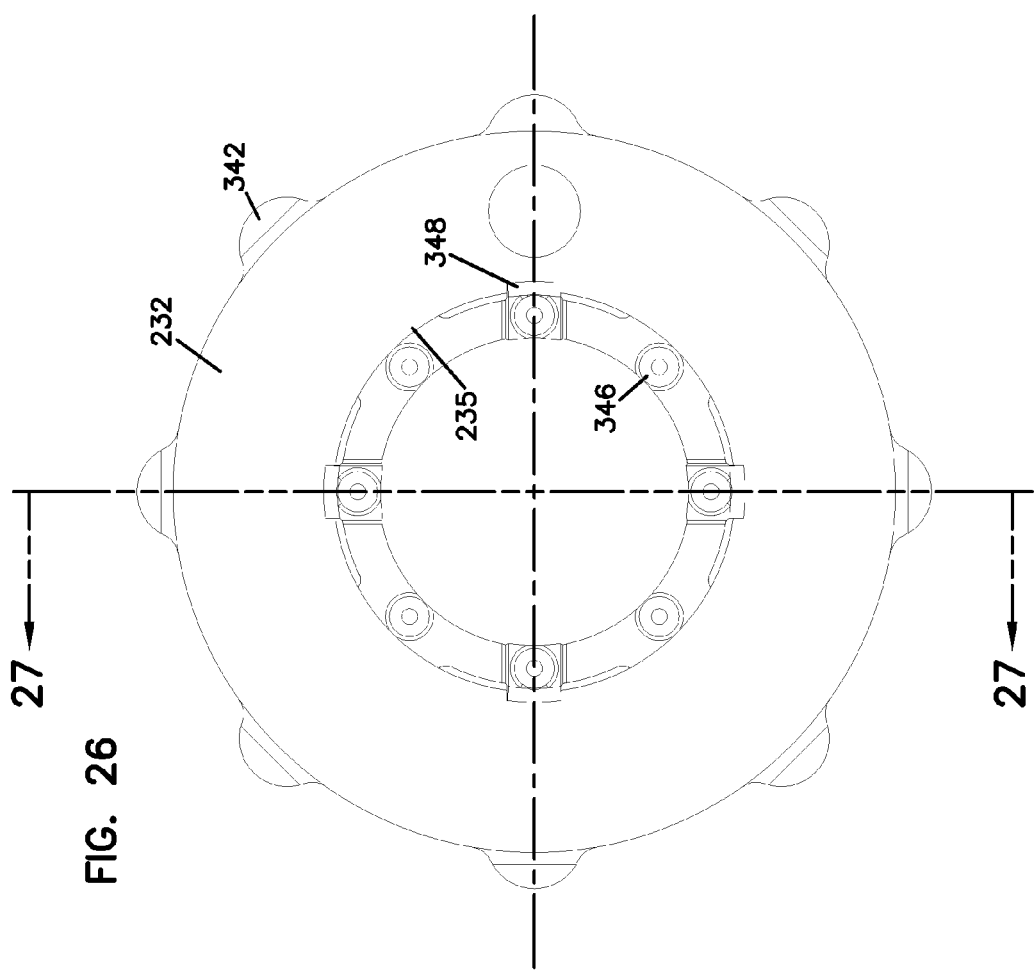

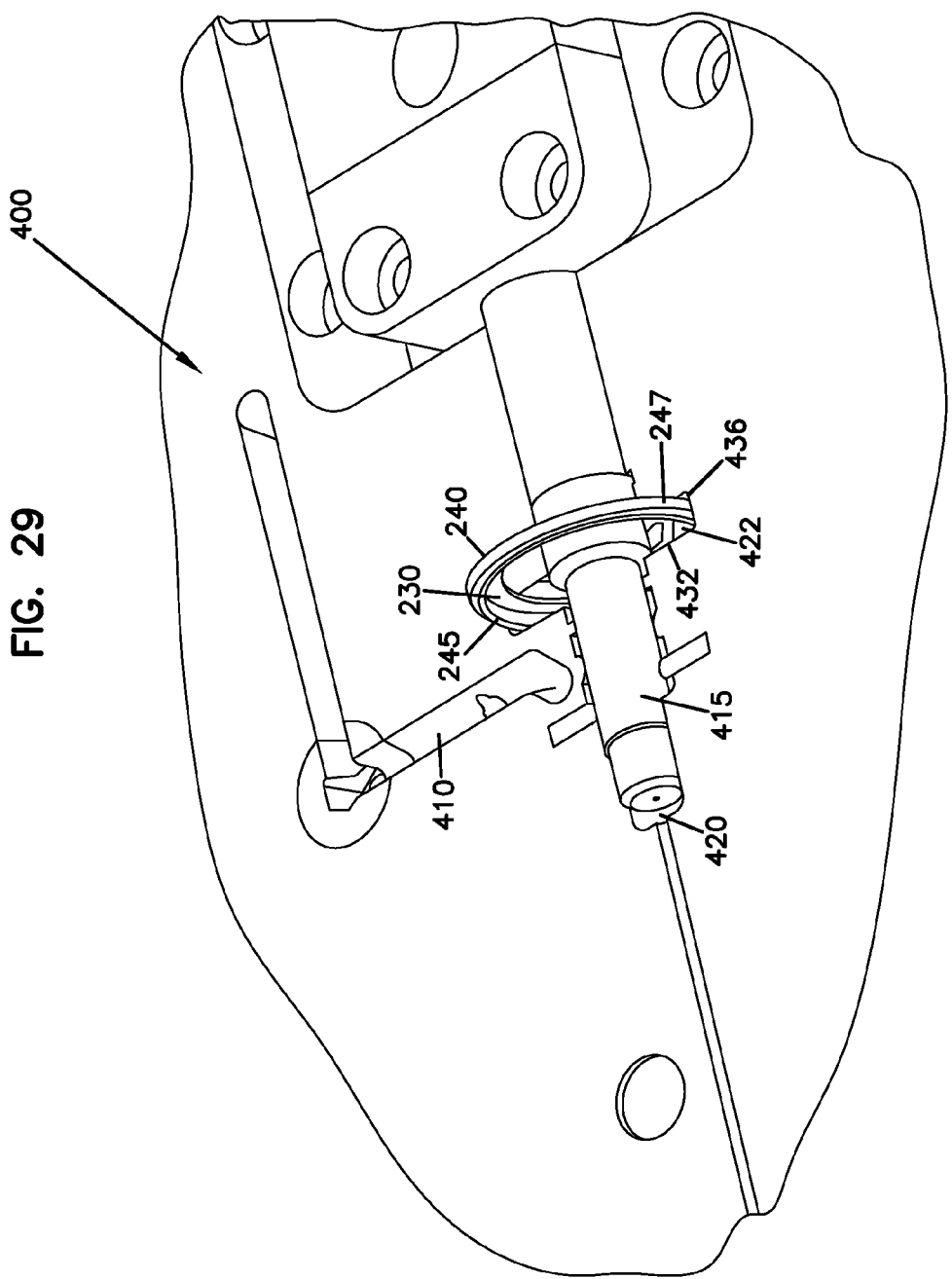

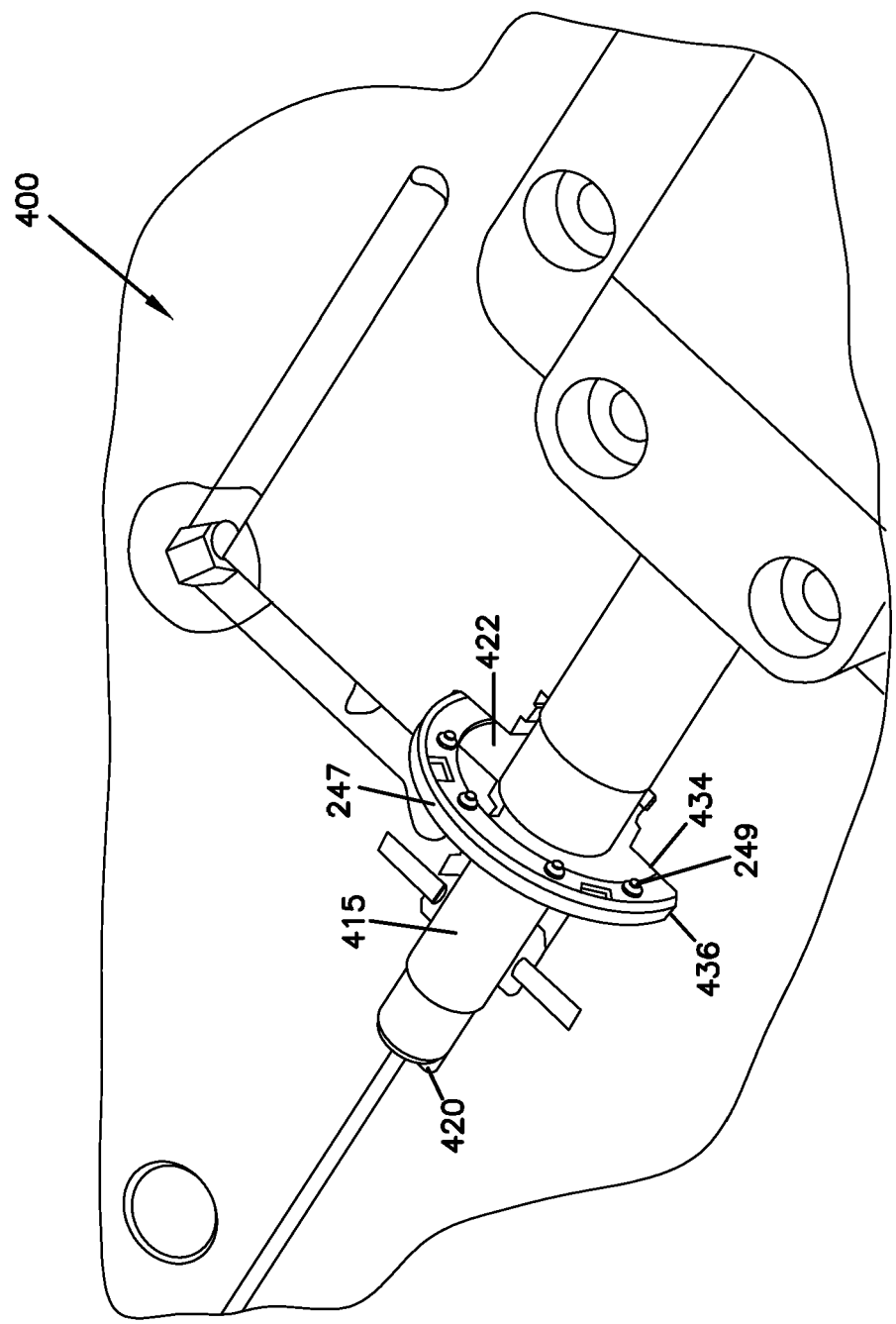

COUPLER WITH RADIO FREQUENCY IDENTIFICATION TAG

RELATED APPLICATION

This application claims the benefit of U.S. Patent Provisional Application Ser. No. 60/612,711, filed on Sep. 24, 2004 and entitled "Smart Coupler with an Overmolded RFID Tag," the entirety of which is hereby incorporated by reference.

TECHNICAL FIELD

Embodiments of the present invention relate to couplers having radio-frequency identification tags incorporated therein.

BACKGROUND

Couplers including electronic components have been employed in connectors for fluid dispensing or conveyance applications. In particular, these "smart" couplers have incorporated data receiving and storage technology for operating and monitoring the connectors when used in the field. Typically, radio frequency technology has been used for receiving electronic data and indicator information in the form of radio frequency identification (RFID) tags. Couplers employing this technology are capable of receiving and storing useful data with respect to product and flow parameter information. Such technology incorporated with couplers can provide safeguards for proper connection with other fluid system equipment, such as a fluid line or other connected transfer/dispensing parts. Further, using radio-frequency technology provides a mechanism for inventory control.

As one example, U.S. Pat. No. 6,649,829 to Garber, commonly assigned with the instant application herein and incorporated by reference in its entirety, employs a coupler having radio-frequency capability and an RFID tag connected on one connector for use in fluid transfer applications.

SUMMARY

Embodiments of the present invention relate to couplers having radio-frequency identification tags incorporated therein.

According to one aspect, a coupler includes a main body including a first end and a second end, and defining a flow passage between the first and second ends to allow fluid flow therethrough. The coupler also includes a frame member, and a radio frequency identification tag coupled to the frame member. The frame member including the radio frequency identification tag are molded into the main body.

According to another aspect, a coupler includes a main body including a first end, a second end, and a flange therebetween, the main body defining a flow passage between the first and second ends to allow fluid flow therethrough. The coupler also includes a frame member including a first side, a second side, and a clip member, and a radio frequency identification tag coupled to the first side of the frame member by the clip member. The frame member including the radio frequency identification tag are molded into the flange of the main body so that the radio frequency identification tag is encapsulated in the main body.

According to yet another aspect, a method for forming a fluid coupler includes: coupling an radio frequency identification tag to a frame member; locating the frame member and the radio frequency identification tag in a mold; and molding the coupler so that the coupler includes the frame member and the radio frequency identification tag.

These and other various advantages and features are pointed out in the following detailed description. Reference should also be made to the drawings which form a further part hereof, and to accompanying descriptive matter, in which there are illustrated and described specific examples.

DESCRIPTION OF THE DRAWINGS

Like reference numbers generally indicate corresponding elements in the Figures.

FIG. 2 is an exploded perspective view of the coupler of FIG. 1 showing one embodiment of a main body and a peripheral member.

FIG. 8 is a front end view of the peripheral member of the coupler of FIG. 1.

FIG. 9 is a cross-sectional view of the peripheral member taken along line 9-9 of FIG. 8.

FIG. 10 is a partial view of the peripheral member of FIG. 9.

FIG. 11 is a front perspective view of another embodiment of a coupler.

FIG. 12 is a rear perspective view of the coupler of FIG. 11.

FIG. 13 is a front perspective view of a radio frequency identification tag.

FIG. 14 is a rear perspective view of the radio frequency identification tag of FIG. 13.

FIG. 15 is a front perspective view of a frame member.

FIG. 16 is a rear perspective view of the frame member of FIG. 15.

FIG. 17 is a front perspective view of the frame member of FIG. 15 with the radio frequency identification tag of FIG. 13 attached thereto.

FIG. 18 is a front end view of the frame member and radio frequency identification tag of FIG. 17.

FIG. 19 is a cross-sectional view of the frame member and radio frequency identification tag taken along line 19-19 of FIG. 17.

FIG. 26 is a front end view of the frame member and radio frequency identification tag of FIG. 25.

FIG. 27 is a cross-sectional view of the frame member and radio frequency identification tag taken along line 27-27 of FIG. 26.

FIG. 29 is a front perspective view of one side of a mold for the coupler of FIG. 11.

FIG. 30 is a rear perspective view of the mold of FIG. 29.

DETAILED DESCRIPTION

Figure 1:
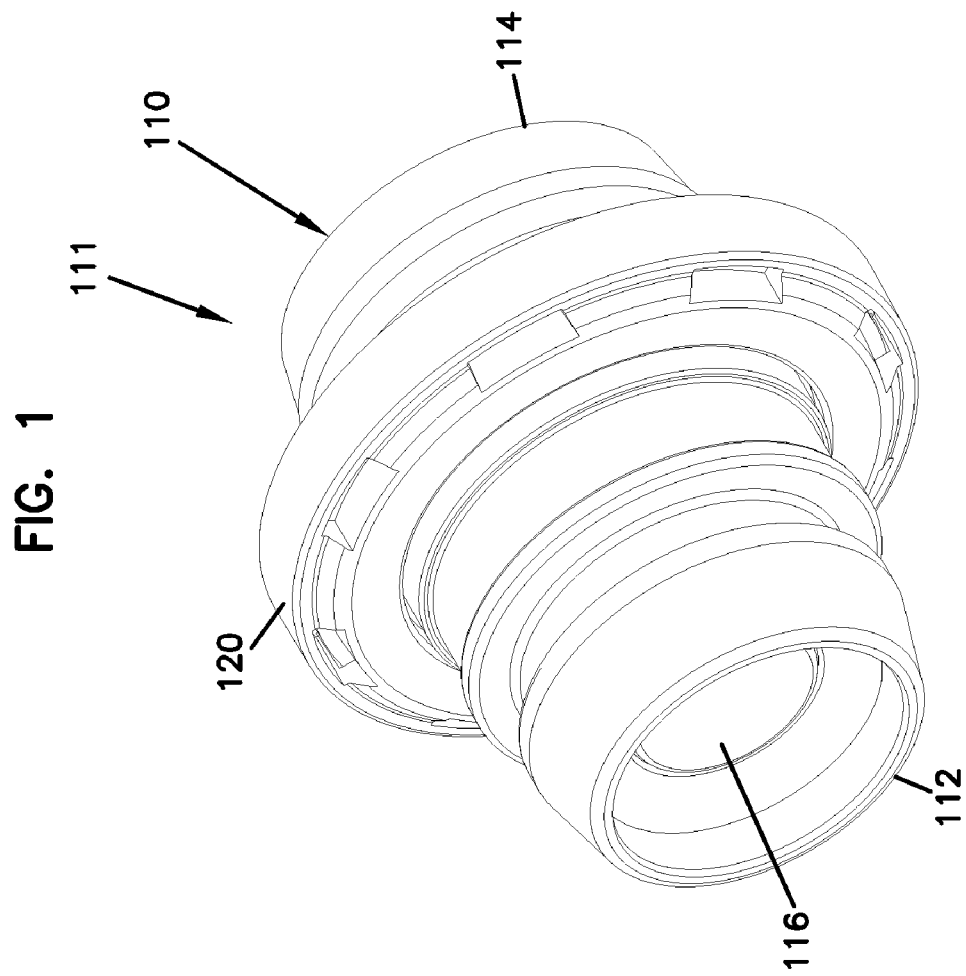
FIG. 1 is a perspective view of one embodiment of a coupler.
Figure 4:
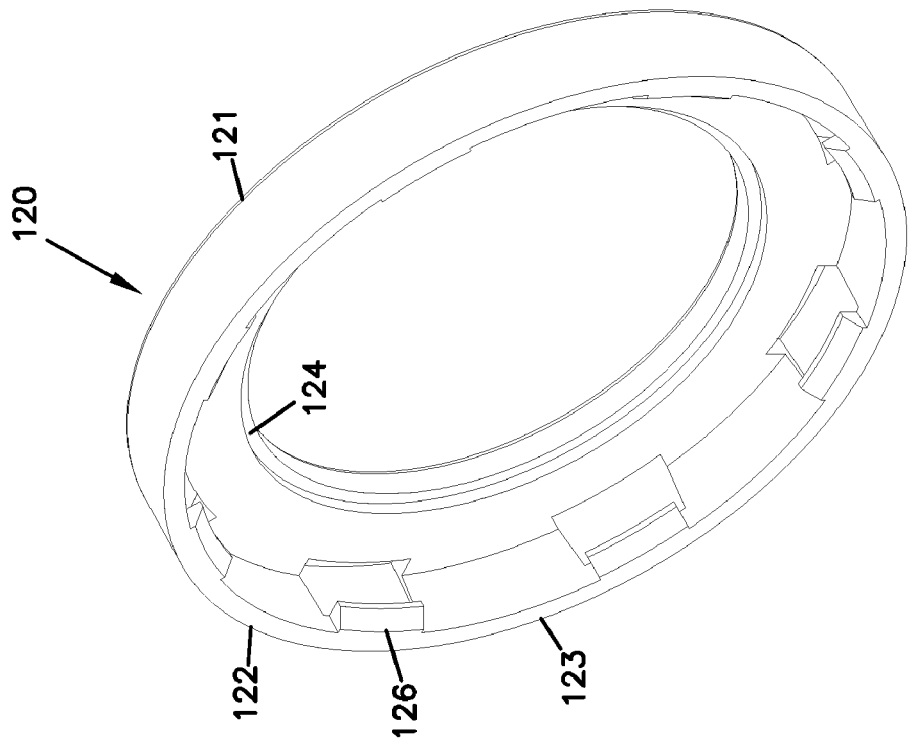
FIG. 4 is a perspective rear view of the peripheral member of FIG. 1.
Figure 3:
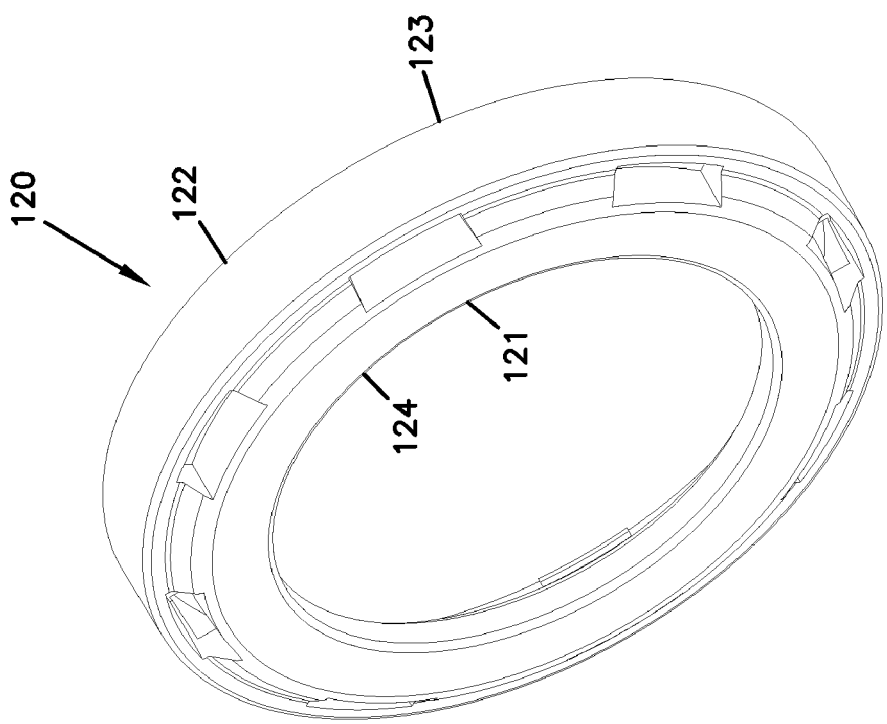
FIG. 3 is a perspective front view of the peripheral member of FIG. 1.
Figure 6:
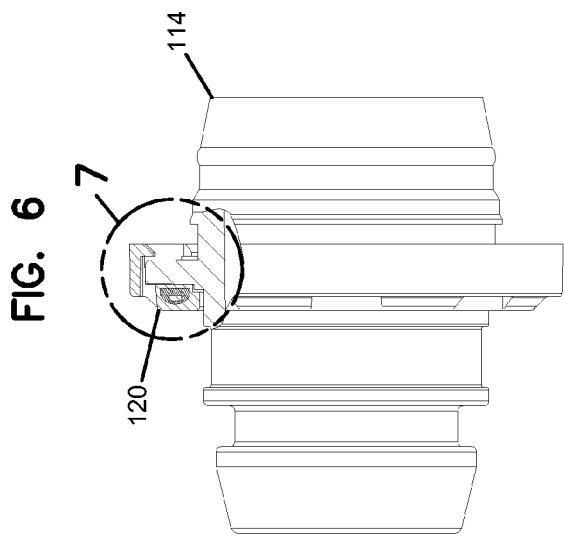
FIG. 6 is a side view of the coupler of FIG. 1 showing a partial cross-section taken along line 6-6 of FIG. 5.
Figure 7:
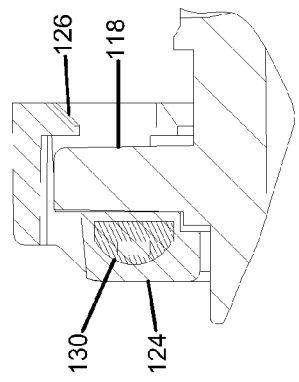
FIG. 7 is a partial view of the coupler of FIG. 6.
Figure 5:
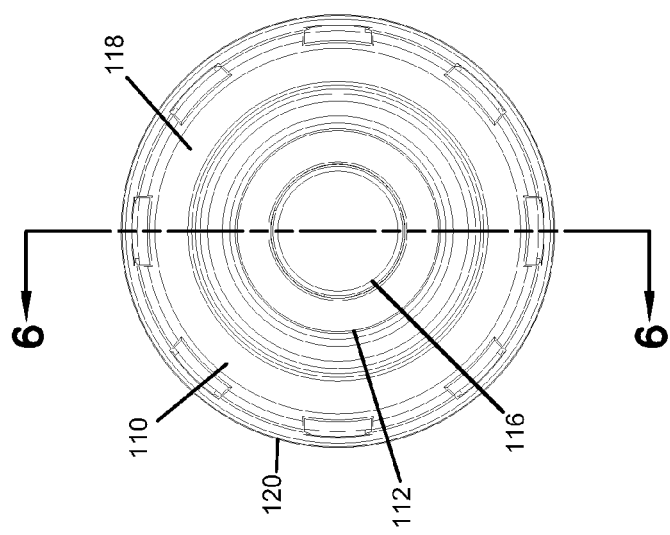
FIG. 5 is a front end view of the coupler of FIG. 1.

Embodiments of the present invention relate to couplers having radio-frequency identification tags incorporated therein.

One embodiment of a coupler 111 is provided in FIGS. 1-10. Coupler 111 includes main body 110 having first and second ends 112, 114. A flow passage 116 is defined through the main body 110. The main body 110 can include valve structures therein (not illustrated) as known in the art for opening and closing the flow passage 116.

The main body 110 can be structured as a fitment at the second end 114 for connecting the main body 110 to a well known fluid source (not shown), to allow fluid flow from the second end 114 through the main body 110 and first end 112 for exiting fluid or media. An annular flange 118 surrounds an outer portion of the main body 110 and is disposed between the first and second ends 112, 114. In the example shown, the annular flange 118 distinguishes between an inserted portion of the main body 110 proximate the second end 114, which can be inserted into a fluid source, and an exposed portion proximate the first end 112, which can be exposed from the fluid source.

As one example, a fluid source can be a bag-in-box typically used for fluid dispensing, for instance, in food dispensing applications. The main body of the closure can also be connected with other suitable fluid sources and can be employed in other media transfer applications other than fluid dispensing.

In the example shown, the main body 110 is constructed of a molded plastic material suitable for media transfer and dispensing applications. For example, the main body 110 can be a disposable piece of equipment. Other materials for body can also be used. In other examples, main body 110 can be a reusable part.

A peripheral member 120 can be disposed at an outer portion of the main body 110. The peripheral member 120 defines a main portion 122 having a first side 121 and a second side 123. A connecting portion 124 is used for connecting the peripheral member 120 to the main body 110. In the example shown, the main portion 122 provides a structure for encapsulating an RFID tag 130. The RFID tag 130 can be produced using standard electronic process known in the art. For example, the peripheral member 120 is formed by overmolding the RFID tag 130 with the main portion 122, such that the RFID tag 130 is encapsulated therein. See FIGS. 7 and 10.

As shown in one embodiment, the peripheral member 120 includes a connecting portion 124 extending transversely from the second side 123. The connecting portion 124 can include engaging members 126 extending therefrom. In the embodiment shown, the engaging members 126 are barbed connections for connecting the peripheral member 120 to the main body 110. The engaging members 126 engage and connect to one side of the annular flange 118 in a snap on configuration of attachment. Other known connection structures on the main portion 122 can be used for connecting the peripheral member 120 to the main body 110 of the closure. In one example, the engaging members 126 provide a structure formed as fingers with undercuts such that removal of the peripheral member 120 after being connected with the main body 110 can destroy the RFID tag 130. In this configuration, the peripheral member 120 is disposable if removed from the main body 110.

As shown, the peripheral member 120 is connected to the annular flange 118 at one side proximate the first end 112. In alternative embodiments, the peripheral member 120 can be connected at either side of the annular flange 118. For example, in an alternative embodiment, peripheral member 120 is attached at the side proximate the second end 114, or at any position on the outer surface of the main body 110.

Further, use of the snap on engaging members 126 is provided as an example only. For example, attachment structures such as engaging members 126 may not be required where a peripheral member can be an encapsulated RFID tag overmold member that is sandwiched between the annular flange 118 and a fluid source. In such a configuration, the peripheral member can effectively be trapped between the fluid source and the annular flange.

By allowing the peripheral member 120 to encapsulate the RFID tag 130, the RFID tag 130 can be overmolded into a separate structure that is connectable to the main body 110 of the closure. In this configuration, the peripheral member 120 allows the RFID tag 130 to remain separate from the main body 110, so that the main body 110 can be sterilized while preserving the RFID tag 130 from the harmful effects of sterilization, such as from electron beam or gamma radiation sterilization procedures. The coupler 111 including the main body 110 and peripheral member 120 can provide the flexibility of introducing the overmolded peripheral member 120 at any time during the product sales chain during and after filling of a connecting fluid source. Further, the RFID tag 130 is provided with a protective overmold coating so as to protect the RFID tag from a harmful external environment when in use.

In the example shown, the peripheral member 120 is constructed of a molded plastic material.

In the example shown in FIGS. 1-10, the peripheral member with the RFID tag encapsulated inside allows the main body of the coupler to be sterilized by radiation while preserving the functionality (e.g., data receiving and storing capability) of the RFID tag in the peripheral member. After sterilization of the main body, the peripheral member can be assembled with the main body for effective use in fluid dispensing or transfer application. The coupler provides the RFID tag protected within the overmold of the peripheral member for use as convenient and cost effective coupling device.

Referring now to FIGS. 11-20, an example embodiment of another coupler 211 is shown. As shown in FIGS. 11 and 12, coupler 211 includes a main body 210 having first and second ends 212, 214 and a flow passage 216 formed therethrough. Valve structures (not shown) can be included for opening and closing flow passage 216. Coupler 211 also includes a flange 218 incorporating an RFID tag 230, as described further below.

In the example shown, coupler 211 is formed using a thermoplastic. For example, in one embodiment coupler 211 is injection molded using polypropylene. In other examples, other types of thermoplastics such as acetal, polycarbonate, ABS, Teflon, and polysulfone can be used. Thermoplastic elastomers (TPEs), thermoplastic rubbers (TPRs), or other materials can also be used.

Referring now to FIGS. 13 and 14, RFID tag 230 is shown. In the example shown, RFID tag 230 includes a main body 232 and an RFID chip 234. In the example shown, main body 232 is a printed circuit board (PCB), and RFID chip 234 is an I-CODE RFID Chip manufactured by Philips Semiconductors. Other types of RFID chips can also be used.

The example main body 232 of RFID tag 230 incorporates a plurality of etchings (not shown) such that main body 232 functions as an antenna to facilitate communication between RFID tag 230 and an external RFID reader (not shown). In the example shown, main body 232 is round with an open interior 236, although other shapes can also be used depending on the geometry of the coupler. For example, in other embodiments, main body 232 can be square, rectangular, oblong, etc. RFID chip 234 is coupled to main body 232.

Referring now to FIGS. 15 and 16, an example embodiment of a frame member 240 is shown. Frame member 240 includes first and second sides 242, 244 and an open interior 246. Frame member 240 also includes an outer sidewall 247 extending from first side 242 with a surface 245, and clip members 248 extending from sidewall 247. As described further below, clip members 248 are used to attach RFID tag 230 to frame member 240. Second side 244 of frame member 240 includes members 249. In the example shown, frame member 240 is round, although other shapes can also be used depending on the geometry of the RFID tag 230.

In the example shown, frame member 240 is formed using a thermoplastic. For example, in one embodiment coupler 211 is injection molded using polypropylene. In other examples, other types of thermoplastics such as acetal, polycarbonate, ABS, Teflon, and polysulfone can be used. Thermoplastic elastomers (TPEs), thermoplastic rubbers (TPRs), or other materials can also be used. In one example, coupler 211 and frame member 240 are formed using the same material.

Referring now to FIG. 17-19, RFID tag 230 is shown attached to frame member 240. Main body 232 of RFID tag 230 is positioned within sidewall 247 of frame member 240. As RFID tag 230 is attached to frame member 240, an outer edge 233 of main body 232 contacts and slides past clip members 248. Once in place in frame member 240, clip members 248 engage outer edge 233 of main body 232 to maintain attachment of RFID tag 230 to frame member 240. See FIG. 19.

Other structures and methods can be used to couple RFID tag 230 to frame member 240. For example, in alternative embodiments mechanical fasteners such as one or more screws can be used. In yet other embodiments, an adhesive can be used.

Figure 20:
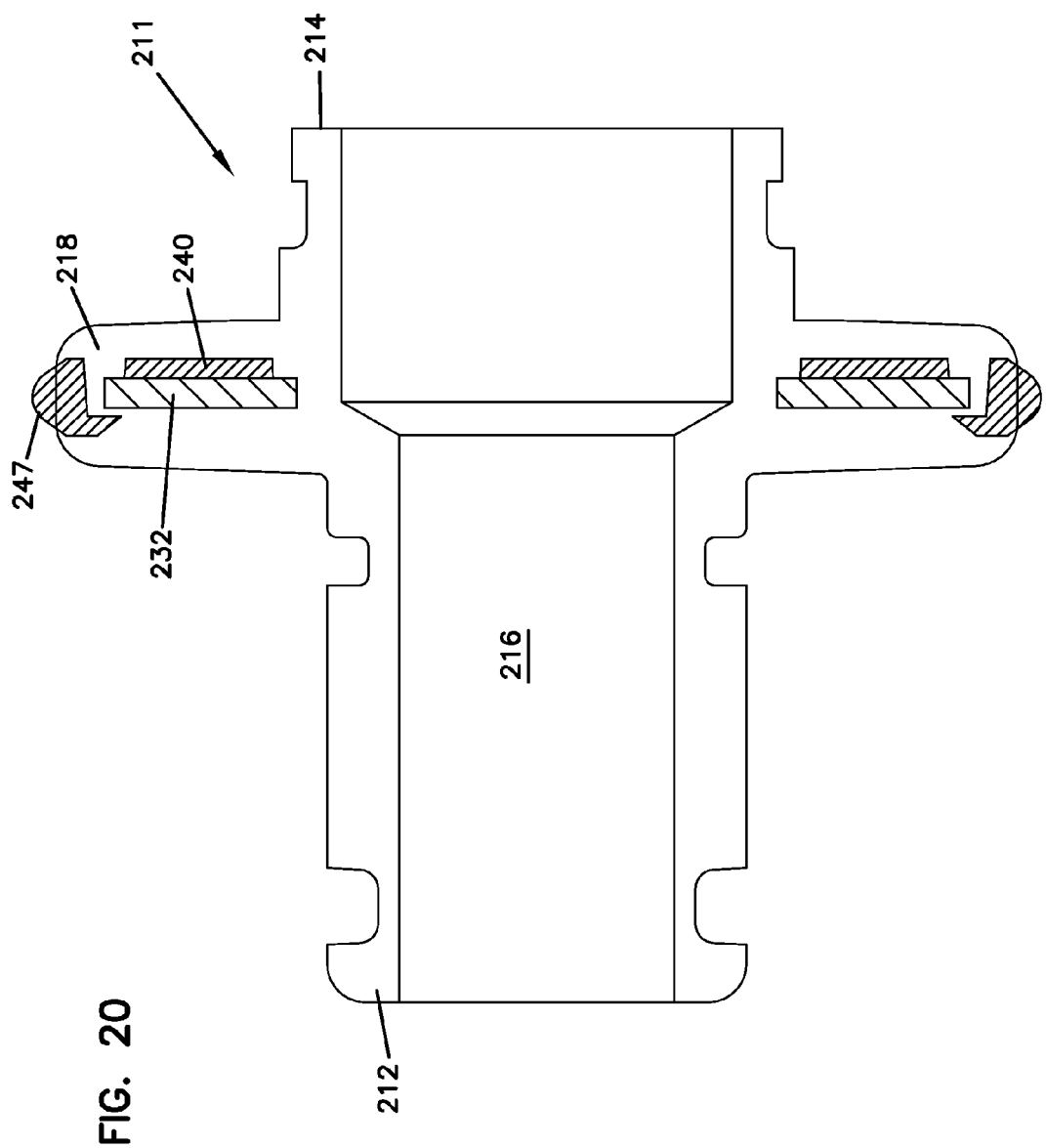
FIG. 20 is a cross-sectional view of the coupler of FIG. 11.

Referring now to FIG. 20, coupler 211 is shown with RFID tag 230 and frame member 240 incorporated therein. As described further below, coupler 211 is formed so that frame member 240 and RFID tag 230 attached thereto are incorporated into flange 218. Open interiors 236, 246 of RFID tag 230 and frame member 240 allow flow passage 216 of coupler 211 to extend therethrough. An RFID reader (not shown) can be used to read and write to RFID tag 230 incorporated into coupler 211.

Referring now to FIGS. 21-28, another example embodiment of a coupler 311 is shown. Coupler 311 is similar to coupler 211 described above, and includes RFID tag 230. Coupler 311 also includes an example frame member 340 to hold RFID tag 230.

Figure 24:
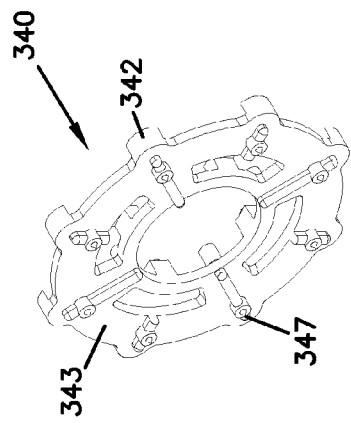
FIG. 24 is a rear perspective view of the frame member of FIG. 23.
Figure 23:
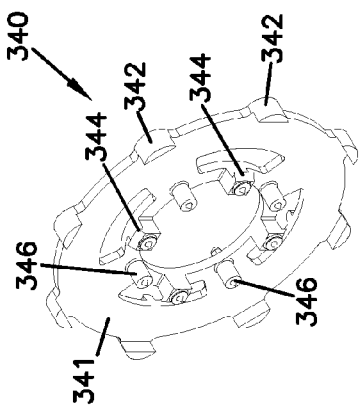
FIG. 23 is a front perspective view of a frame member.

Referring to FIGS. 23 and 24, a first side 341 of frame member 340 includes members 342 extending from an outer diameter of frame member 340, and members 346 located along an inner diameter of frame member 340. Several members 346 include clips members 344 extending therefrom. Members 347 extend from a second side 343 of frame member 340.

Figure 25:
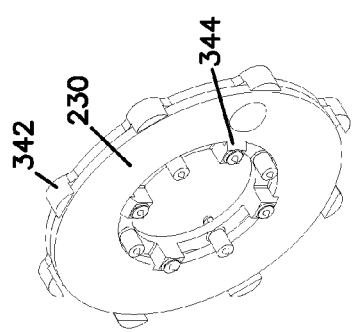
FIG. 25 is a front perspective view of the frame member of FIG. 23 with a radio frequency identification tag attached thereto.
Figure 21:
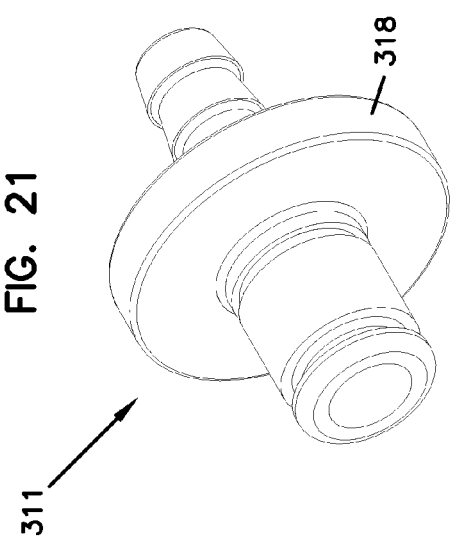
FIG. 21 is a front perspective view of another embodiment of a coupler.
Figure 22:
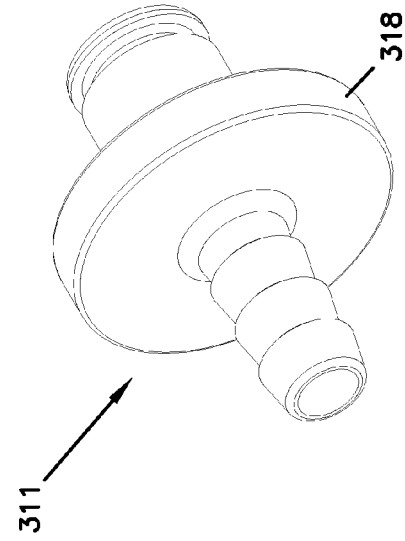
FIG. 22 is a rear perspective view of the coupler of FIG. 21.

Referring now to FIG. 25-27, RFID tag 230 is shown attached to frame member 340. Main body 232 of RFID tag 230 is positioned between members 342, 344 of frame member 340. As RFID tag 230 is attached to frame member 340, an inner edge 235 (see FIG. 13) of main body 232 contacts and slides past clip members 344. Once in place in frame member 340, clip members 344 engage inner edge 235 of main body 232 to maintain attachment of RFID tag 230 to frame member 340. See FIG. 27.

Figure 28:
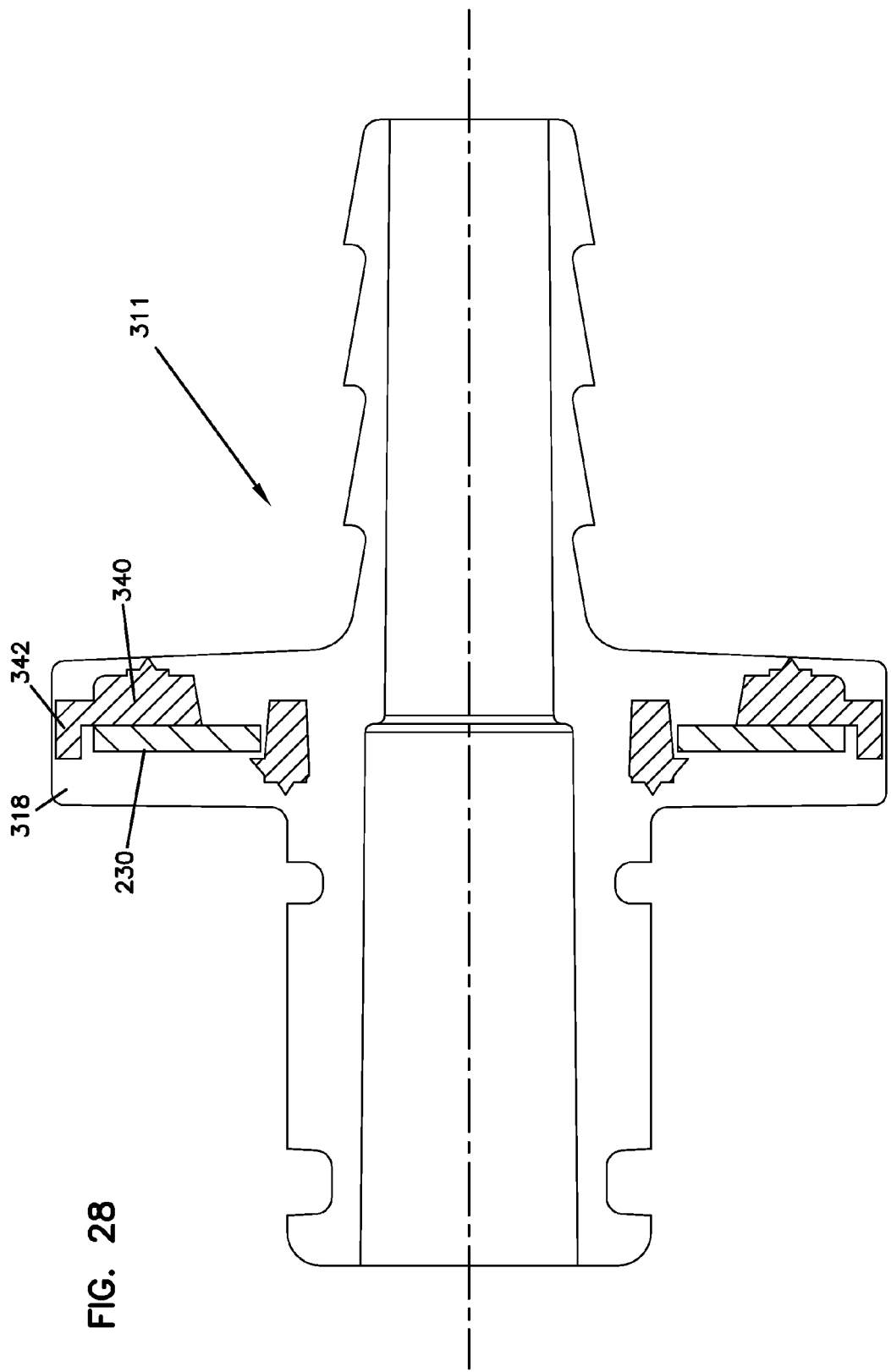
FIG. 28 is a cross-sectional view of the coupler of FIG. 21.

Referring now to FIG. 28, coupler 311 is shown with RFID tag 230 and frame member 340 incorporated therein. As described further below, coupler 311 is formed so that frame member 340 and attached RFID tag 230 are incorporated into a flange 318 of coupler 311. An RFID reader (not shown) can be used to read and write to RFID tag 230 incorporated into coupler 311.

Referring now to FIGS. 29 and 30, an example system 400 for molding a coupler such as coupler 211 (see FIGS. 11 and 12) is shown. System 400 includes a runner 410 extending from a source of plastic material to a cavity area 420. A core pin 415 extends into cavity area 420.

A portion 422 of cavity area 420, including walls 432, 434, 436, is sized to receive frame member 240. Outer sidewall 247 of frame member 240 contacts wall 436 of portion 422 to locate frame member 240 radially in portion 422 of cavity area 420. In addition, surface 245 and opposed members 249 contact walls 432, 434 of portion 422 of cavity 420 to locate frame member 240 axially.

With frame member 240 and attached RFID tag 230 located as shown in FIGS. 29 and 30, plastic is injected from runner 410 into cavity area 420 to form coupler 211. When injection molding is complete, coupler 211 is formed as shown in FIGS. 11 and 12. Since only portions of frame member 240 (i.e., sidewall 247, surface 245, and members 249) are in contact with walls 432, 434, 436 of cavity area 420, RFID tag 230 is encapsulated in coupler 211. For example, sidewall 247 of frame member 240 can form an outer diameter edge 219 of flange 218 (see FIG. 12) after coupler 211 is molded. Further, during the injection molding process, the plastic used to form coupler 211 including flange 218 is bonded to frame member 240 to provide a fluid tight seal so that RFID tag 230 is completely encapsulated in coupler 211.

Coupler 311 can be formed using a similar injection molding process, except that members 342 are used to locate frame member 340 radially within the cavity area, and members 346, 347 are used to locate frame member 340 axially within the cavity area.

The above specification provides a complete description of the composition, manufacture and use of the improved penetrable membrane in accordance with the principles of the present invention. Since many embodiments of the invention can be made without departing from the spirit and scope of the invention.

What is claimed is:

1. A coupler, comprising:
   a main body including a first end and a second end, and defining a flow passage between the first and second ends to allow fluid flow therethrough;
   a frame member; and
   a radio frequency identification tag coupled to the frame member;
   wherein the frame member including the radio frequency identification tag are molded into the main body, wherein the main body is formed using injection molding, and wherein the radio frequency identification tag is encapsulated in the main body during the injection molding.

2. The coupler of claim 1, wherein the frame member includes one or more clip members configured to couple the radio frequency identification tag to the frame member.

3. The coupler of claim 1, wherein the frame member is configured to be molded into a flange of the main body of the coupler.

4. The coupler of claim 3, wherein a portion of an outer diameter surface of the frame member forms a portion of an outer diameter surface of the flange of the main body.

5. A coupler, comprising:
   a main body including a first end, a second end, and a flange therebetween, the main body defining a flow passage between the first and second ends to allow fluid flow therethrough;
   a frame member including a first side, a second side, and a clip member; and
   a radio frequency identification tag coupled to the first side of the frame member by the clip member;
   wherein the frame member including the radio frequency identification tag are molded into the flange of the main body so that the radio frequency identification tag is encapsulated in the main body; and
   wherein the frame member includes a plurality of members extending from the second side of the frame member, wherein the plurality of members are configured to axially locate the frame member and the attached radio frequency identification tag during molding of the coupler.

6. The coupler of claim 5, wherein an outer diameter surface of the frame member forms a portion of an outer diameter surface of the flange of the main body.

7. The coupler of claim 5, wherein the radio frequency identification tag is encapsulated in the flange of the main body.

8. The coupler of claim 5, wherein the frame member and the radio frequency identification tag both define openings allowing the flow passage of the main body to extend therethrough.

9. A method for forming a fluid coupler, comprising:
   coupling a radio frequency identification tag to a frame member;
   locating the frame member and the radio frequency identification tag in a mold; and
   injection molding the coupler so that the coupler includes the frame member and encapsulates the radio frequency identification tag.

10. The method of claim 9, wherein coupling further comprises pressing the radio frequency identification tag into the frame member so that clip members of the frame member hold the radio frequency identification tag.

11. The method of claim 9, wherein locating further comprises allowing an outer circumference of the frame member to contact the mold to radially locate the frame member and the radio frequency identification tag with respect to the mold.

12. The method of claim 11, wherein locating further comprises allowing members of the frame member to contact the mold to axially locate the frame member and the radio frequency identification tag with respect to the mold.

13. The method of claim 9, wherein injection molding further comprises encapsulating the radio frequency identification tag in a flange of the coupler.

14. The method of claim 13, wherein injection molding further comprises allowing an outer diameter surface of the frame member to form an outer diameter surface of the flange.

15. The method of claim 9, further comprising forming openings in the frame member and the radio frequency identification tag to allow a flow passage of the coupler to extend therethrough.

16. The method of claim 15, further comprising forming the frame member and the radio frequency identification tag to be circular.

* * * * *